US012769698B2

(12) United States Patent
Yu

(10) Patent No.: US 12,769,698 B2
(45) Date of Patent: Oct. 20, 2026

(54) DETECTION METHOD OF UNIVERSAL SERIAL BUS TYPE-C

(71) Applicant: Getac Technology Corporation, New Taipei City (TW)

(72) Inventor: Wen-Huan Yu, Taipei City (TW)

(73) Assignee: Getac Technology Corporation, New Taipei City (TW)

( * ) Notice: Subject to any disclaimer, the term of this patent is extended or adjusted under 35 U.S.C. 154(b) by 0 days.

(21) Appl. No.: 19/011,734

(22) Filed: Jan. 7, 2025

(65) Prior Publication Data

US 2025/0335389 A1 Oct. 30, 2025

(30) Foreign Application Priority Data

Apr. 26, 2024 (CN) ......................... 202410510630.7

(51) Int. Cl.
*G06F 13/42* (2006.01)

(52) U.S. Cl.
CPC .. *G06F 13/4282* (2013.01); *G06F 2213/0042* (2013.01)

(58) Field of Classification Search
CPC .... G06F 1/266; G06F 11/221; G06F 11/2273; G06F 11/2284; G06F 13/4068; G06F 13/4282
See application file for complete search history.

(56) References Cited

U.S. PATENT DOCUMENTS

2012/0198101 A1* 8/2012 Porcella .............. G06F 13/4081 710/15
2015/0249804 A1* 9/2015 Kasahara ............... G09G 5/006 345/205
2016/0028252 A1* 1/2016 Bajpai ...................... H02J 7/485 320/106
2018/0210783 A1* 7/2018 Sasahara ............... G06F 9/4411
(Continued)

FOREIGN PATENT DOCUMENTS

CN 108873759 B 5/2021
CN 112838566 A 5/2021
(Continued)

OTHER PUBLICATIONS

"Battery Charging Specification Revision 1.2", USB Implementers Forum, Inc., Dec. 7, 2010, Retrieved from the Internet: http://www.usb.org/developers/devclass_docs (retrieved on Sep. 26, 2013), 71 pages.
(Continued)

*Primary Examiner* — Phong H Dang
(74) *Attorney, Agent, or Firm* — COOPER LEGAL GROUP LLC

(57) ABSTRACT

A detection method of universal serial bus Type-C includes identifying a first connection state between a universal serial bus Type-C and a connection port through a host system, determining whether the first connection state accords with a default connection state through the host system. When a result of the determination is no, transferring a first com-
(Continued)

100 mand through the host system to cutoff the first connection state between the universal serial bus Type-C and the connection port, and transferring a second command through the host system to connect the universal serial bus Type-C and the connection port in the default connection state.

20 Claims, 4 Drawing Sheets

(56) References Cited

U.S. PATENT DOCUMENTS

| | | | | |
|---|---|---|---|---|
| 2020/0394149 | A1* | 12/2020 | Chen | G06F 13/4286 |
| 2022/0263278 | A1 | 8/2022 | Kim | |
| 2023/0161723 | A1* | 5/2023 | Kasichainula | G06F 1/266 710/105 |

FOREIGN PATENT DOCUMENTS

| | | | | | |
|---|---|---|---|---|---|
| CN | 114069801 | A | | 2/2022 | |
| CN | 115017075 | B | | 4/2023 | |
| CN | 116154921 | A | | 5/2023 | |
| CN | 115622177 | B | * | 10/2023 | H02J 7/80 |
| CN | 116742761 | B | | 11/2023 | |
| CN | 112583064 | B | | 2/2024 | |
| CN | 117767487 | A | | 3/2024 | |
| TW | 202032380 | A | | 9/2020 | |

OTHER PUBLICATIONS

Avygdor Moise, "usb_20_0702115.zip.pdf", IEEE Draft WGDS, IEEE-SA Imeet Central, Piscataway, NJ, USA, vol. 1704, Dec. 8, 2014, p. 1, Retrieved from the Internet: URL:https://ieee-sa.imeetcentral.com/p/aQAAAAACfL4O (retrieved on May 22, 2015), 572 pages.

* cited by examiner

DETECTION METHOD OF UNIVERSAL SERIAL BUS TYPE-C

This application claims priority to China Application Serial Number 202410510630.7, filed Apr. 26, 2024, which is herein incorporated by reference.

BACKGROUND

Field of Disclosure

The present disclosure relates to a detection method of universal serial bus Type-C.

Description of Related Art

Universal serial bus (USB) has become a mainstream communication interface. USB Type-C is widely used in data and image transmission and charging procedures between multiple devices. However, if the host system encounters an abnormality during Type-C identification, a re-plugging operation typically needs to be performed to eliminate the abnormality.

Therefore, it is of critical importance to automatically identify the connection error in Type-C and to correct the connection error.

SUMMARY

One aspect of the present disclosure includes a detection method of universal serial bus Type-C.

In some embodiments, the detection method of universal serial bus Type-C includes identifying a first connection state between a universal serial bus Type-C and a connection port through a host system; determining whether the first connection state is consistent with a default connection state through the host system; and when a result of the determination is no, transferring a first command through the host system to cutoff the first connection state between the universal serial bus Type-C and the connection port; and transferring a second command through the host system to connect the universal serial bus Type-C and the connection port in the default connection state.

In some embodiments, the default connection state is defined by a charging port type and a power delivery.

In some embodiments, the detection method of universal serial bus Type-C further includes when the result of the determination is no, sending an identification error signal through the host system.

In some embodiments, transferring the first command through the host system to cutoff the first connection state between the universal serial bus Type-C and the connection port includes transferring the first command to switch the default connection state to a second connection state.

In some embodiments, the types of the connection port in the second connection state includes Micro-USB, Mini-USB, USB-B, and USB-A.

In some embodiments, transferring the second command through the host system to connect the universal serial bus Type-C and the connection port in the default connection state includes transferring the second command such that the type of the connection port is switched back to USB Type-C.

In some embodiments, transferring the first command through the host system to cutoff the first connection state between the universal serial bus Type-C and the connection port includes cutting off a power supply.

In some embodiments, transferring the second command through the host system to connect the universal serial bus Type-C and the connection port in the default connection state includes recovering the power supply.

In some embodiments, cutting off and recovering the power supply further includes changing a voltage of a Vbus pin of the universal serial bus Type-C.

In some embodiments, cutting off and recovering the power supply further includes switching a switch of a Vbus pin electrically connected to the universal serial bus Type-C.

Another aspect of the present disclosure is a detection method of universal serial bus Type-C.

In some embodiments, the detection method of universal serial bus Type-C includes identifying a first connection state between a universal serial bus Type-C and a connection port through a host system; determining whether the first connection state is consistent with a default connection state through the host system; and when a result of the determination is no, transferring a first command through the host system to switch the default connection state to a second connection state; and transferring a second command through the host system to connect the universal serial bus Type-C and the connection port in the default connection state.

In some embodiments, the default connection state is defined by a charging port type and a power delivery.

In some embodiments, the detection method of universal serial bus Type-C of claim 11 further includes when the result of the determination is no, sending an identification error signal through the host system.

In some embodiments, the types of the connection port in the second connection state comprises Micro-USB, Mini-USB, USB-B, and USB-A.

In some embodiments, transferring the second command through the host system to connect the universal serial bus Type-C and the connection port in the default connection state includes transferring the second command such that the type of the connection port is switched back to USB Type-C.

In some embodiments, the detection method of universal serial bus Type-C of claim 11 further includes after transferring the first command through the host system to switch the default connection state to the second connection state, determining whether the second connection state is consistent with a default connection state through the host system.

In some embodiments, after determining whether the second connection state is consistent with a default connection state through the host system, cutting off a power supply when a result of the determination is no.

In some embodiments, transferring the second command through the host system to connect the universal serial bus Type-C and the connection port in the default connection state further includes recovering the power supply.

In some embodiments, cutting off and recovering the power supply includes changing a voltage of a Vbus pin of the universal serial bus Type-C.

In some embodiments, cutting off and recovering the power supply includes switching a switch of a Vbus pin electrically connected to the universal serial bus Type-C.

In the aforementioned embodiments, through the Universal Serial Bus Type-C detection method of the present disclosure, Universal Serial Bus Type-C can be correctly identified without re-plugging and unplugging the Universal Serial Bus Type-C. When an identification error occurs, it automatically reconnects the universal serial bus Type-C and the connection port by switching the connection status or switching the power supply to prevent the host system from being unable to perform normal charging, discharging or data transmission through the universal serial bus Type-C.

DETAILED DESCRIPTION

Figure 1:
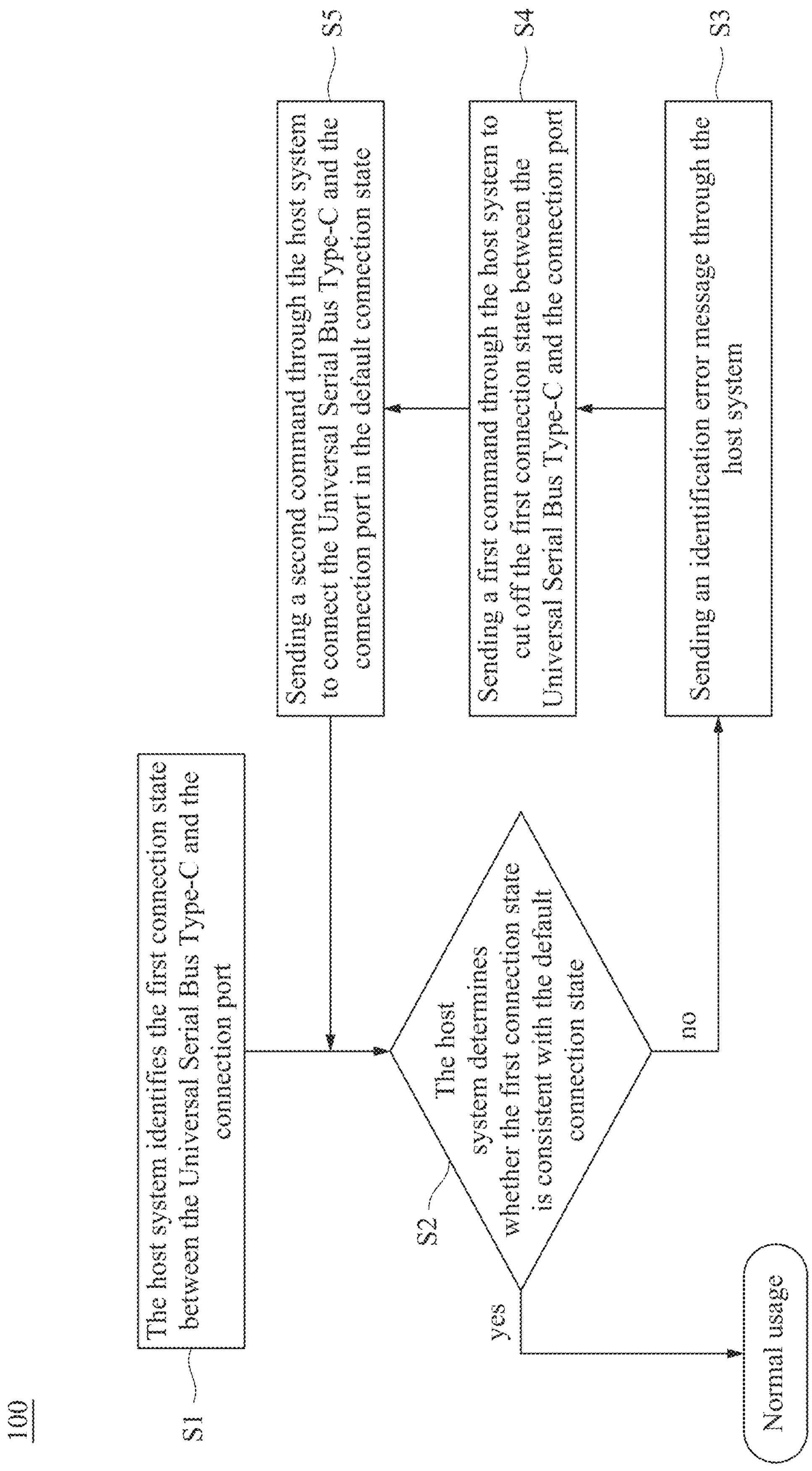
FIG. 1 is a flow chart of a detection method of a universal serial bus (USB) Type-C according to one embodiment of the present disclosure.

Reference will now be made in detail to the present embodiments of the invention, examples of which are illustrated in the accompanying drawings. Wherever possible, the same reference numbers are used in the drawings and the description to refer to the same or like parts.

Figure 2:
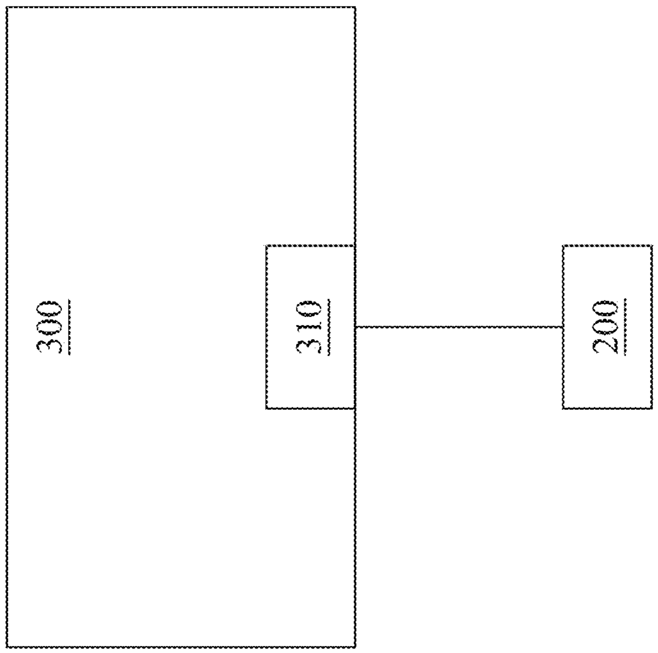
FIG. 2 is a block diagram of a host system and an USB Type-C according to one embodiment of the present disclosure.

FIG. 1 is a flow chart of a detection method 100 of a universal serial bus (USB) Type-C according to one embodiment of the present disclosure. FIG. 2 is a block diagram of a host system and an USB Type-C according to one embodiment of the present disclosure. Reference is made to FIG. 1 and FIG. 2. The detection method 100 of the universal serial bus Type-C 200 is applied to the host system 300 that can be connected to the universal serial bus Type-C 200. The host system 300 is, for example, a desktop computer, a notebook computer, or a smartphone, etc. The host system 300 is coupled to the universal serial bus Type-C 200 through the connection port 310. The detection method 100 Type-C 200 can be installed on the devices such as screens, power supplies, hard drives, or USB hubs, etc.

The detection method 100 of the universal serial bus Type-C 200 is used for reconnection when an identification error is detected, thereby preventing the host system 300 from having a universal serial bus Type-C 200 identification error and being unable to perform charging, discharging, or data transmission normally through the universal serial bus Type-C 200.

When the host system 300 is connected to the universal serial bus Type-C 200, the detection method 100 of the universal serial bus Type-C 200 starts to be executed. Reference is made to FIG. 1, the detection method 100 of the universal serial bus Type-C starts from step S1, the host system 300 identifies the first connection state between the universal serial bus Type-C 200 and the connection port 310. The first connection state includes, for example, a charging port type and a power delivery type.

The detection method 100 of the universal serial bus Type-C 200 continues to step S2, the host system 300 determines whether the first connection state is consistent with the default connection state. The default connection state is defined by the charging port type and the power delivery to which the connection port 310 of the host system 300 is expected to be connected. Charging port types include, for example, Charging Downstream Port (CDP), Dedicated Charging Port (DCP), Standard Downstream Port (SDP), and ACA (Accessary Charge Adapter), etc. Different charging port types each have specific maximum currents and current ranges that vary with voltage.

The power delivery includes, for example, programmable power supply (PPS), Data Role definition, and Power Role definition. Data Role definitions can include Downstream Facing Port (DFP), Upstream Facing Port (UFP), or Dual Role Data (DRD). Power Role definition can include power supply (Source), power supply (Sink), and dual role port (Dual Role Power, DRP).

When the first connection status detected by the host system 300 is consistent with the default connection status, it means that the device connected to the universal serial bus Type-C 200 can be used normally. When the first connection status detected by the host system 300 is not consistent with the default connection status, it means that the host system 300 cannot identify the correct connection status or cannot be connected, and the device connected to the host system 300 through the universal serial bus Type-C 200 cannot be used normally.

For example, the default connection state is to connect via universal serial bus Type-C 200 to a device which is charged at 12 volts and 3 amps. The host system 300 has an error in identifying the universal serial bus Type-C 200, and the first connection state detected may be a device charging with a voltage of 5 volts and a current of 0.1 amps. In the case of identification error, the device connected to universal serial bus Type-C 200 cannot be used normally.

Therefore, when the determination result of step S2 is no, the universal serial bus Type-C detection method 100 continues to step S3, and the host system 300 sends an identification error message.

The universal serial bus Type-C detection method 100 continues to step S4, sending a first command through the host system 300 to cut off the first connection state between the universal serial bus Type-C 200 and the connection port 310.

In one embodiment, the first command to cut off the first connection state between the universal serial bus Type-C 200 and the connection port 310 can switch the default connection state to the second connection state. The second connection state is different from the first connection state. For example, the connection type corresponding to the connection port 310 in the second connection state may include Micro-USB, Mini-USB, USB-B, USB-A, etc. In other words, as long as it is a USB type other than the USB Type-C. The first command causes the host system 300 to control the connection port 310 to connect the universal serial bus Type-C 200 in the second connection state, which is equivalent to causing the connection port 310 of the host system 300 not to connect to the universal serial bus Type-C 200.

The universal serial bus Type-C detection method 100 continues to step S5, and a second command is sent through the host system 300 to connect the universal serial bus Type-C 200 and the connection port 310 in a default connection state.

Continuing from the above embodiment, after switching the default connection state to the second connection state in step S4, a second command is sent in step S5 to switch the connection type corresponding to the connection port 310 back to Type-C. This approach is equivalent to restarting the connection state between port 310 and universal serial bus Type-C 200 without re-plugging universal serial bus Type-C 200.

In another embodiment, the first command to cut off the first connection state between the universal serial bus Type-C 200 and the connection port 310 in step S4 is used to cut off the power supply. In step S5, the second command to connect the universal serial bus Type-C 200 and the connection port 310 with a preset connection type is used to restore power supply.

Figure 3:
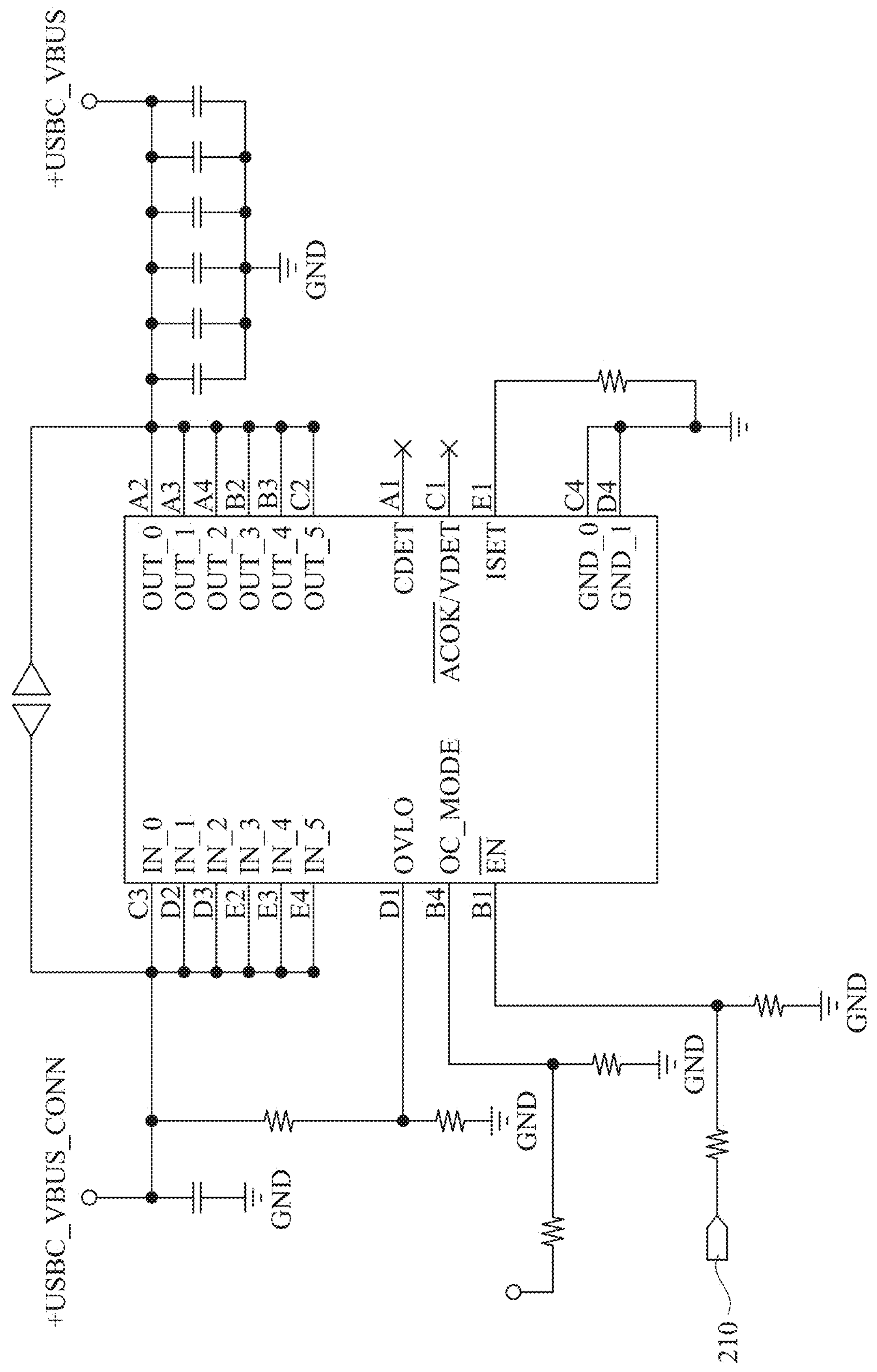
FIG. 3 is a circuit diagram of a universal serial bus Type-C according to one embodiment of the present disclosure.

FIG. 3 is a circuit diagram of a universal serial bus Type-C 200 according to one embodiment of the present disclosure. For example, the power supply can be cut off and restored by switching the switch 210 connected to the Vbus pin of the universal serial bus Type-C 200, so that the switch 210 is turned off (power OFF) and then turned on (power ON).

Figure 4A:
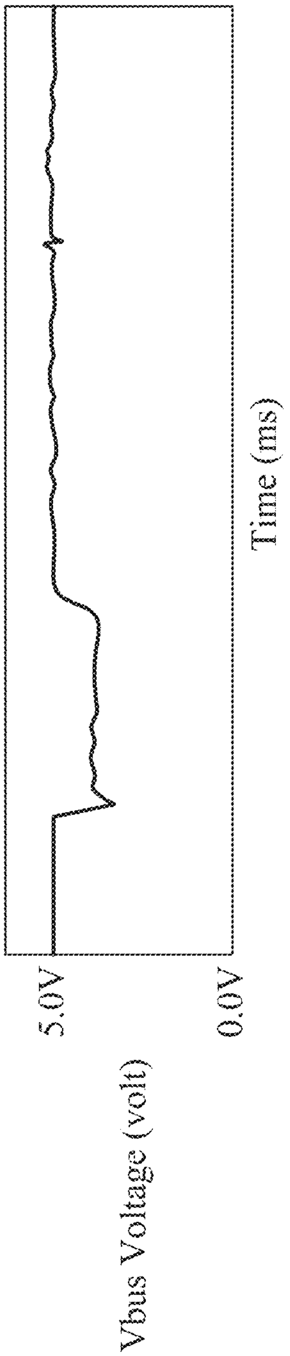
FIG. 4A is a schematic diagram of the Vbus pin voltage of the universal serial bus Type-C according to one embodiment of the present disclosure.

FIG. 4A is a schematic diagram of the Vbus pin voltage of the universal serial bus Type-C according to one embodiment of the present disclosure. FIG. 4A shows the voltage when the first connection state in step S2 is not consistent with the default connection state. The Vbus pin voltage of universal serial bus Type-C 200 is not completely pulled down and does not drop to 0 volts.

Figure 4B:
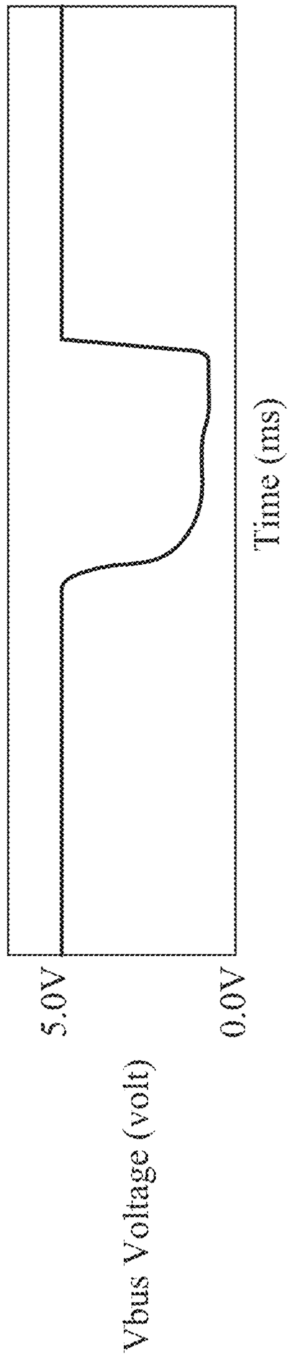
FIG. 4B is a schematic diagram of the Vbus pin voltage of the universal serial bus Type-C according to one embodiment of the present disclosure.

FIG. 4B is a schematic diagram of the Vbus pin voltage of the universal serial bus Type-C according to one embodiment of the present disclosure. FIG. 4B illustrates the voltages in steps S4 and S5. The method of cutting off and restoring the power supply can change the voltage value of the Vbus pin of universal serial bus Type-C 200, so that the voltage of the Vbus pin of universal serial bus Type-C 200 is pulled down to 0 volts and then returned to 5 volts. This approach is equivalent to retrying the connection between port 310 and universal serial bus Type-C 200 without re-plugging universal serial bus Type-C 200.

In another embodiment, the method of switching the default connection state to the second connection state and then switching back to the default connection state can be performed successively with the method of cutting off and then restoring the power supply to increase the success rate of correctly connecting the universal serial bus Type-C 200.

After completing the aforementioned steps S1 to S5, the universal serial bus Type-C detection method 100 returns to step S2, and determining whether the first connection status is consistent with the default connection status through the host system 300 is performed again. When the determination result of step S2 is no, steps S3 to step S5 of the universal serial bus Type-C detection method 100 are continuously executed until the determination result of step S2 is yes.

In summary, through the universal serial bus Type-C detection method of the present disclosure, universal serial bus Type-C can be correctly identified without re-plugging and unplugging the universal serial bus Type-C. When an identification error occurs, it automatically reconnects the universal serial bus TYPE-C and the connection port by switching the connection status or switching the power supply to prevent the host system from being unable to perform normal charging, discharging or data transmission through the universal serial bus Type-C.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention covers modifications and variations of this invention provided they fall within the scope of the following claims.

What is claimed is:

1. A detection method of universal serial bus (USB) Type-C, comprising:

identifying a first connection state between a USB Type-C and a connection port through a host system;

determining whether the first connection state is consistent with a default connection state through the host system; and when a result of the determination is no:

transferring a first command through the host system to cutoff the first connection state between the USB Type-C and the connection port;

transferring a second command through the host system to connect the USB Type-C and the connection port in the default connection state;

transferring a third command through the host system to switch the default connection state to a second connection state; and transferring a fourth command through the host system to connect the USB Type-C and the connection port in the default connection state such that a combination of transferring the first command and transferring the second command is performed successively with transferring the third command and transferring the fourth command.

2. The detection method of USB Type-C of claim 1, wherein the default connection state is defined by a charging port type and a power delivery.

3. The detection method of USB Type-C of claim 1, further comprising:

when the result of the determination is no, sending an identification error signal through the host system.

4. The detection method of USB Type-C of claim 1, wherein types of the connection port in the second connection state comprise Micro-USB, Mini-USB, USB-B, and USB-A.

5. The detection method of USB Type-C of claim 1, wherein transferring the fourth command through the host system to connect the USB Type-C and the connection port in the default connection state comprises:

transferring the fourth command such that a type of the connection port is switched back to the USB Type-C.

6. The detection method of USB Type-C of claim 1, wherein transferring the first command through the host system to cutoff the first connection state between the USB Type-C and the connection port comprises:

cutting off a power supply.

7. The detection method of USB Type-C of claim 6, wherein transferring the second command through the host system to connect the USB Type-C and the connection port in the default connection state comprises:

recovering the power supply.

8. The detection method of USB Type-C of claim 7, wherein cutting off and recovering the power supply comprises:

changing a voltage of a Vbus pin of the USB Type-C.

9. The detection method of USB Type-C of claim 7, wherein cutting off and recovering the power supply comprises:

switching a switch of a Vbus pin electrically connected to the USB Type-C.

10. A detection method of universal serial bus (USB) Type-C, comprising:

identifying a first connection state between a USB Type-C and a connection port through a host system;

determining whether the first connection state is consistent with a default connection state through the host system; and when a result of the determination is no:

transferring a first command through the host system to switch the default connection state to a second connection state;

transferring a second command through the host system to connect the USB Type-C and the connection port in the default connection state;

transferring a third command through the host system to cutoff the first connection state between the USB Type-C and the connection port; and transferring a fourth command through the host system to connect the USB Type-C and the connection port in the default connection state such that a combination of transferring the first command and transferring the second command is performed successively with transferring the third command and transferring the fourth command.

11. The detection method of USB Type-C of claim 10, wherein the default connection state is defined by a charging port type and a power delivery.

12. The detection method of USB Type-C of claim 10, further comprising:

when the result of the determination is no, sending an identification error signal through the host system.

13. The detection method of USB Type-C of claim 10, wherein types of the connection port in the second connection state comprises Micro-USB, Mini-USB, USB-B, and USB-A.

14. The detection method of USB Type-C of claim 10, wherein transferring the second command through the host system to connect the USB Type-C and the connection port in the default connection state comprises:

transferring the second command such that a type of the connection port is switched back to the USB Type-C.

15. The detection method of USB Type-C of claim 10, further comprising:

after transferring the first command through the host system to switch the default connection state to the second connection state, determining whether the second connection state is consistent with the default connection state through the host system.

16. The detection method of USB Type-C of claim 15, wherein after determining whether the second connection state is consistent with the default connection state through the host system, the detection method further comprises:

when a result of the determination is no, cutting off a power supply.

17. The detection method of USB Type-C of claim 16, further comprising:

transferring a fifth command through the host system to connect the USB Type-C and the connection port in the default connection state to recover the power supply.

18. The detection method of USB Type-C of claim 17, wherein cutting off and recovering the power supply comprises:

changing a voltage of a Vbus pin of the USB Type-C.

19. The detection method of USB Type-C of claim 17, wherein cutting off and recovering the power supply comprises:

switching a switch of a Vbus pin electrically connected to the USB Type-C.

20. The detection method of USB Type-C of claim 10, wherein transferring the first command through the host system to switch the default connection state to the second connection state comprises:

transferring the first command through the host system to switch the default connection state to the second connection state so as to stimulate a disconnection between USB Type-C and the connection port while the USB Type-C is physically connected to the connection port.

* * * * *